Nov. 21, 1967    H. MÜLLER    3,353,795
SAFETY FENCE FOR ROADS
Filed Sept. 6, 1966    6 Sheets-Sheet 5
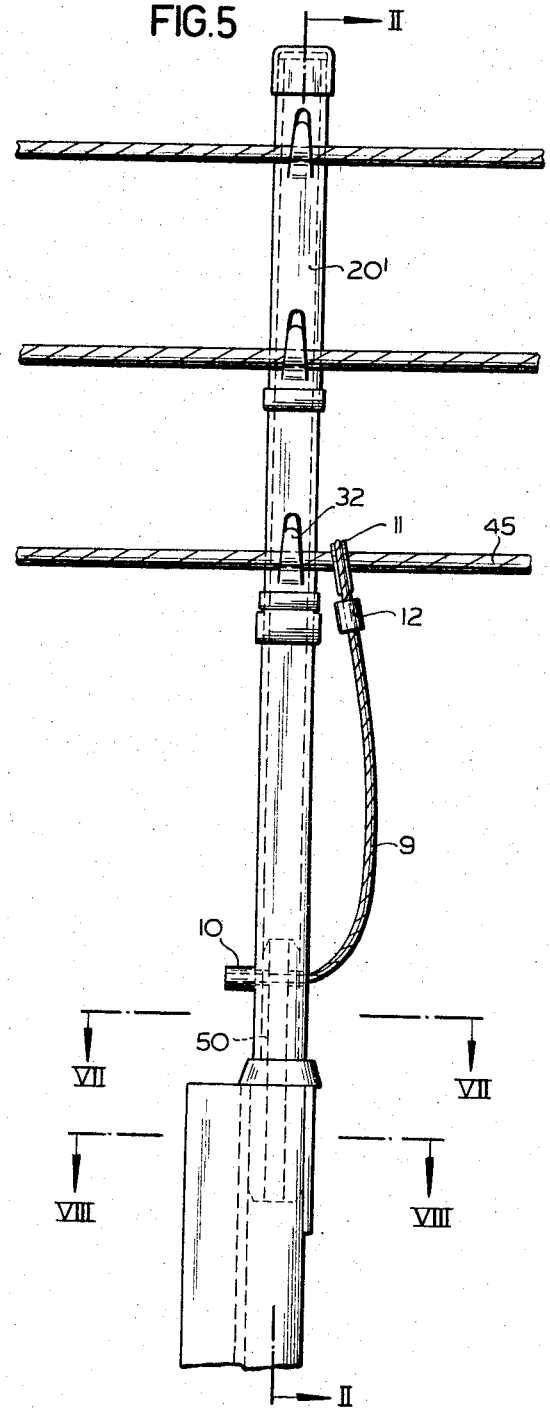
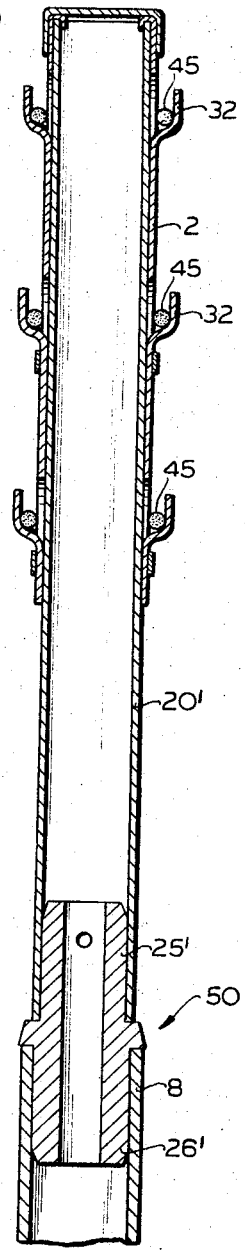
INVENTOR
HUGO MÜLLER
By
Lowry & Rinehart
ATTYS.

Nov. 21, 1967 H. MÜLLER 3,353,795
SAFETY FENCE FOR ROADS
Filed Sept. 6, 1966 6 Sheets-Sheet 6
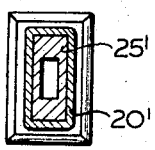
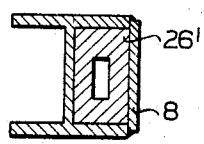
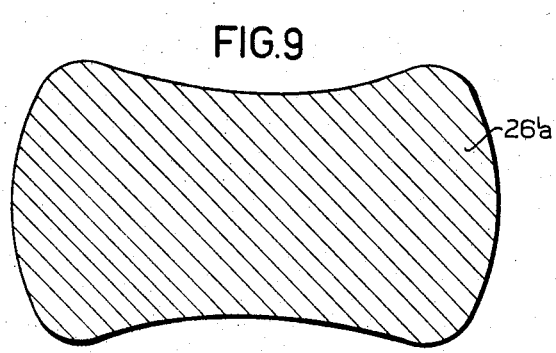
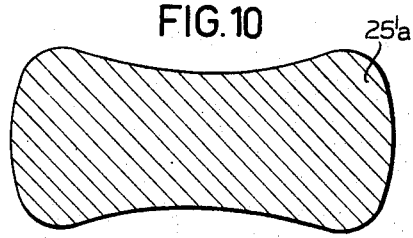
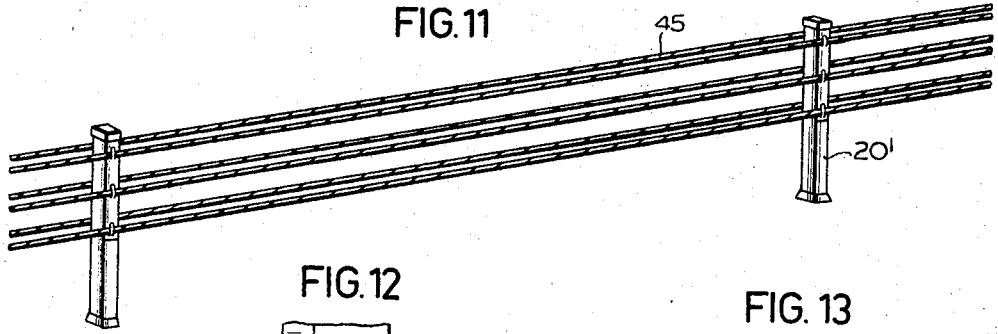
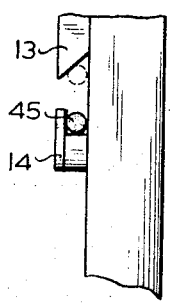
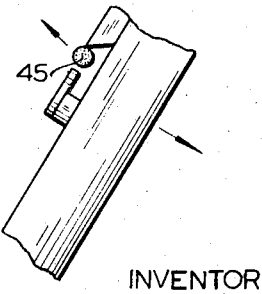
INVENTOR
HUGO MÜLLER
By
Lowry & Rinehart
ATTYS.

United States Patent Office 3,353,795
Patented Nov. 21, 1967

3,353,795
SAFETY FENCE FOR ROADS
Hugo Müller, Stuttgart, Germany, assignor to J. Bertram K.G., Soest, Westphalia, Germany
Filed Sept. 6, 1966, Ser. No. 577,229
6 Claims. (Cl. 256—13.1)

ABSTRACT OF THE DISCLOSURE

A safety fence system for roadways, wherein the fence constrains a very high impact force of a vehicle colliding therewith, gradually absorbing the collision energies and reorienting the direction of said vehicle. A cable means is connected to a line of posts and anchored securely at both ends. Each post is connected to a ground embedded socket by a shear pin which has a shear strength less than that of the post and socket. The cable means are releasably connected to each of the posts. In the system, if a vehicle collides with the safety fence with a sufficient force to cause the shear pins to fail, the cable means develops increasing slack caused by successive breaking of said shear pins, the impact energy being gradually absorbed and the vehicle directed and braked in a direction substantially parallel to the fence. The disclosure involves certain improvements in the basic system, which improvements increase the efficiency of the system and eliminate certain problems arising in the original development. Specifically, the shear pins have a lesser shear strength in the direction of the line of posts than in a direction transversely of the posts, and the cable means are releasably secured to the posts. The improvements include a feature wherein at least the top cable of the cable means is prevented from jumping from its releasable fastening means in the non-sheared posts caused by vibration which occurs when the cable means is struck by a vehicle.

Background of the invention

Many serious accidents on roads, especially highways or speedways, are caused by motor vehicles unintentionally changing their direction of travel and thus either getting on the opposite lane or off the road.

To prevent motor vehicles from getting off the road, sectional steel guide rails have hitherto been used. In the course of time, however, it has proved that such guide rails do not in every case afford protection because they are run over and demolished by heavy vehicles. Even smaller motor vehicles running at high speed against the guide rails have been known to break therethrough or tumble thereover.

Other known safety devices for roads are the so-called guide posts which are provided with a predetermined breaking zone some distance above the ground. These guide posts are not capable, either, of preventing accidents, for when a vehicle collides with a post this is sheared off and a gap results through which the vehicle can get onto the opposite lane and cause serious accidents.

Moreover, so-called safety fences are known in which posts are mounted in sockets fitted in foundations and horizontally extending cables are secured to the posts at various levels thereof. Safety fences of this kind, in which the posts used are not provided with predetermined breaking zones, have already been tested in the United States.

Summary of the invention

It is the object of the present invention to improve and develop the last-mentioned safety fences.

Further objects of the invention will become apparent from the following detailed description.

Description of the drawings

Several embodiments of the invention will now be described by way of example and with reference to the accompanying drawings, in which:

FIG. 5 is an elevational view of a modified post member with a safety cable and hooks in which the horizontal cables are loosely inserted from above;

FIG. 6 is a vertical section on the line II—II of FIG. 5;

FIG. 7 is a horizontal section on the line VII—VII of FIG. 5;

FIG. 8 is a horizontal section on the line VIII—VIII of FIG. 5;

FIGS. 9 and 10 are horizontal sections of symmetric kidney-shaped shearing pins according to a modification;

FIG. 11 is a fragmentary perspective view of a safety fence with post members according to FIG. 5, the safety cables being omitted; and FIGS. 12 and 13 are fragmentary elevational views showing the disposition of a cable supporting hook and a cooperating nose.

Description of the preferred embodiment

Figure 1:
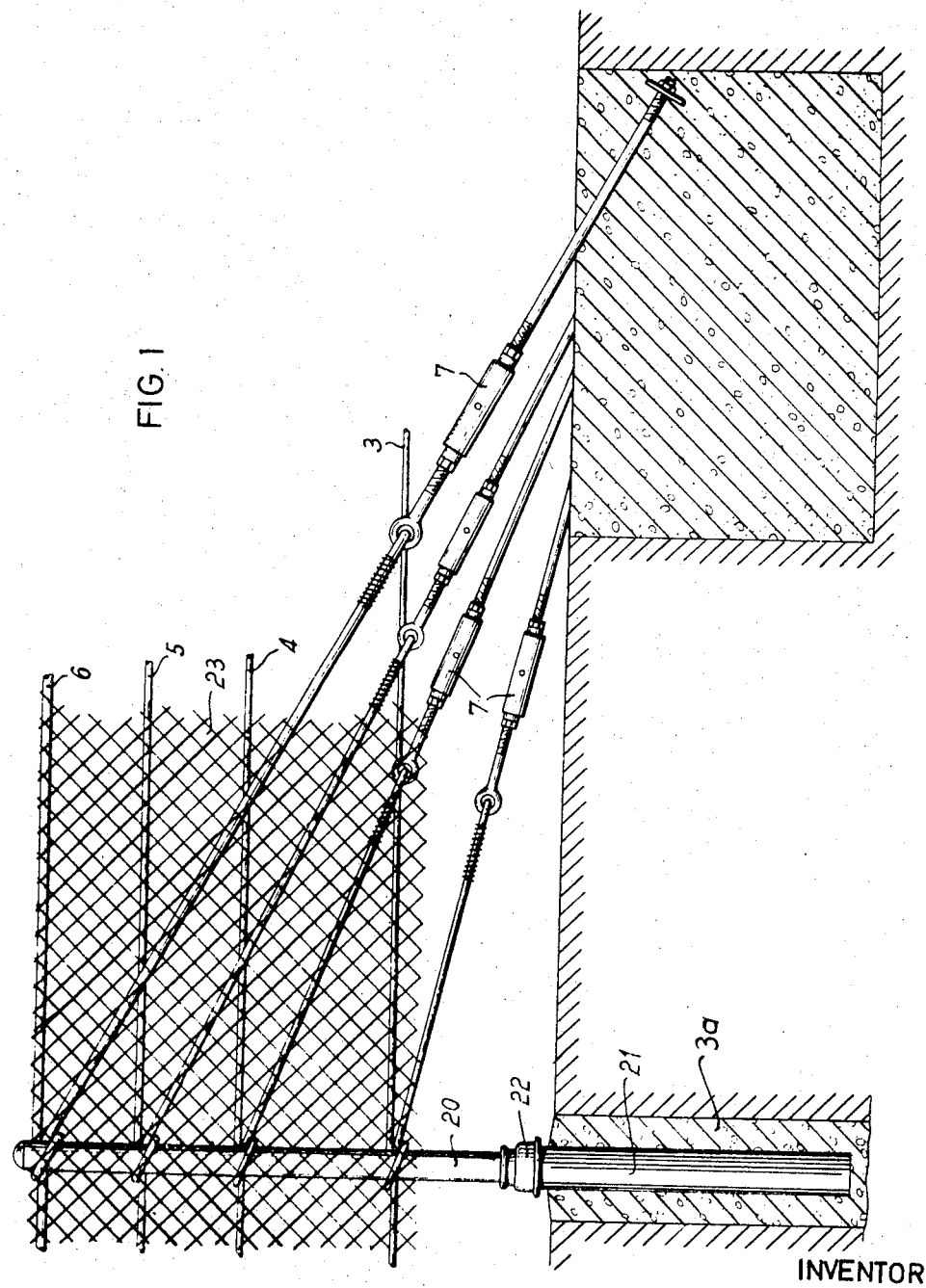
FIG. 1 is an elevational view, partly in section, of one embodiment of a safety fence according to the invention.
Figure 2:
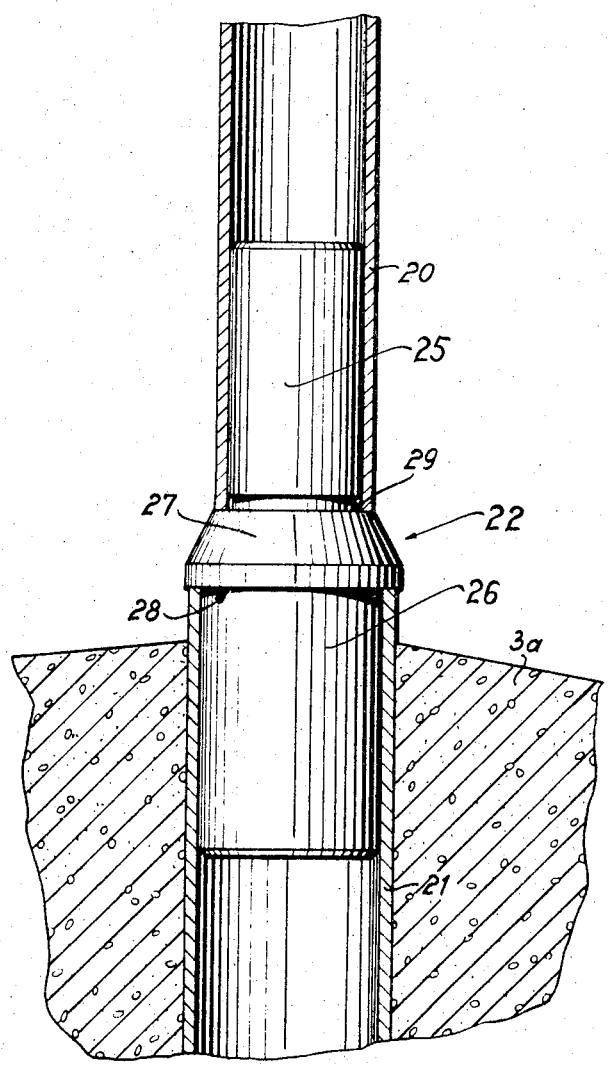
FIG. 2 is a vertical section, on an enlarged scale, through a post member of the safety fence and a socket member fixed in a ground-embedded foundation, the post member and the socket member being interconnected in a male-female relation by means of a shearing pin.

FIGS. 1 and 2 show a safety fence which comprises a plurality of post members of which only one post member 20 is illustrated as mounted in a male-female relation in a socket member 21 by means of a shearing pin 22. The socket member 21 is fixed in a ground-embedded foundation 3a.

As will be seen from FIG. 1 pairs of parallel cables 3, 4, 5 and 6 are secured to the post member 20 at different levels thereof by means of clamping devices to be described hereinafter. The individual cables of each pair of cables 3, 4, 5 and 6 extend on opposite sides of the post member 20 and thus are spaced from each other by the diameter of the post member 20. The cables are tensioned by means of tensioning devices 7. On either side of of the post 20, wire nettings 23 are attached to the respective cables 3, 4, 5 and 6.

The lower pairs of cables 3, 4 and 5 are conveniently chosen of a diameter of 14 mm., whereas the upper pair of cables 6 should have a larger diameter, e.g. of 19 mm. or more. Expediently, the upper pair of cables 6 is arranged about 1 meter above road level.

Figure 3:
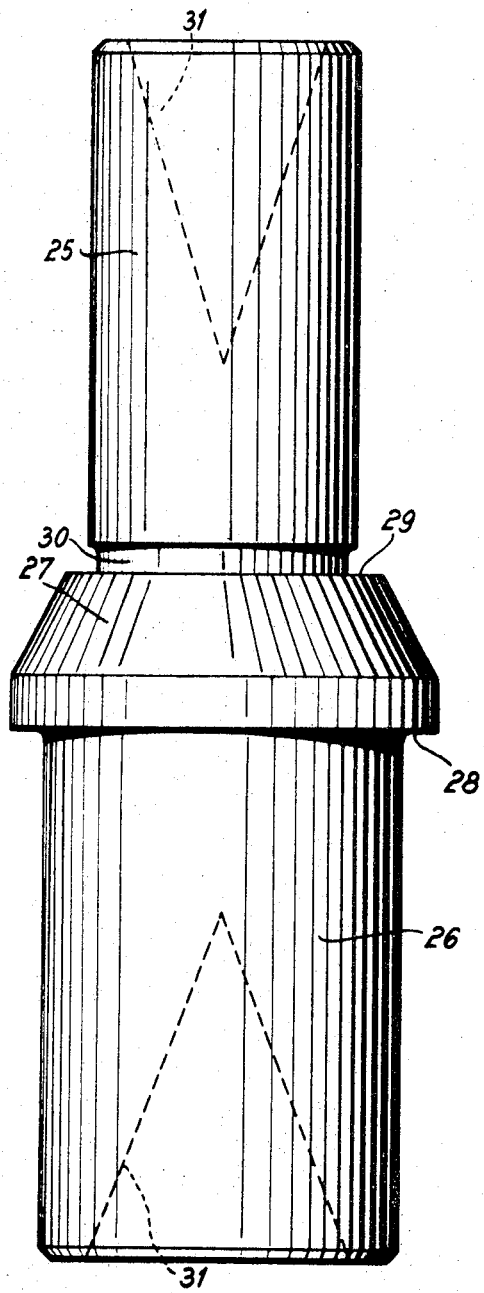
FIG. 3 is an elevational view, on a further enlarged scale, of the shearing pin.

Referring to FIGS. 2 and 3, the shearing pin 22 interconnecting the post member 20 and the socket member 21 has a lower end portion 26 inserted in the socket member 21, an upper end portion 25 inserted in the post member 20 in a male-female relation and a collar 27 intermediate its upper and lower end portions 25 and 26. The collar 27 has a diameter larger than the respective diameters of the upper end portion 25 and the lower end portion 26 of the shearing pin 22 and forms a lower annular end face 28 abutting against the socket member 21, and an upper annular end face 29 supporting the post member 20. This arrangement establishes a simply manageable connection. As can be seen particularly from FIG. 3, the upper end portion 25 has a portion 30 of reduced diameter at its end adjoining the upper end face 29 of the collar 27, which portion 30 constitutes a predetermined breaking zone. In the present case, the diameter of the reduced portion 30 is about 60 mm., which has proved convenient in a series of tests. In some cases even a larger shearing cross section may be used.

The shearing pin 22 is cast in one piece and provided with recesses 31 to save material.

A particular advantage of the shearing pin 22 is that it can be replaced in a simple manner. The collar 27 forms a satisfactory transition from the socket member 21 to the post member 20 in that there are no projecting parts that might constitute a danger in an accident. Due to the fact that the socket member 21 is closed by the lower annular end face 28 of the collar 27, water is prevented from entering the socket member 21.

A further important feature of the proposed safety fence is constituted by the fact that when a motor vehicle runs against the safety fense this will yield to the impact upon breakage of the shearing pins 22, maintaining, however, in any event its vertical position so that it cannot be run over. Therefore, the safety fence must have an appropriate height, e.g. of 1 meter, and the pairs of cables 3, 4, 5 and 6 are appropriately distributed over this height.

Figure 4:
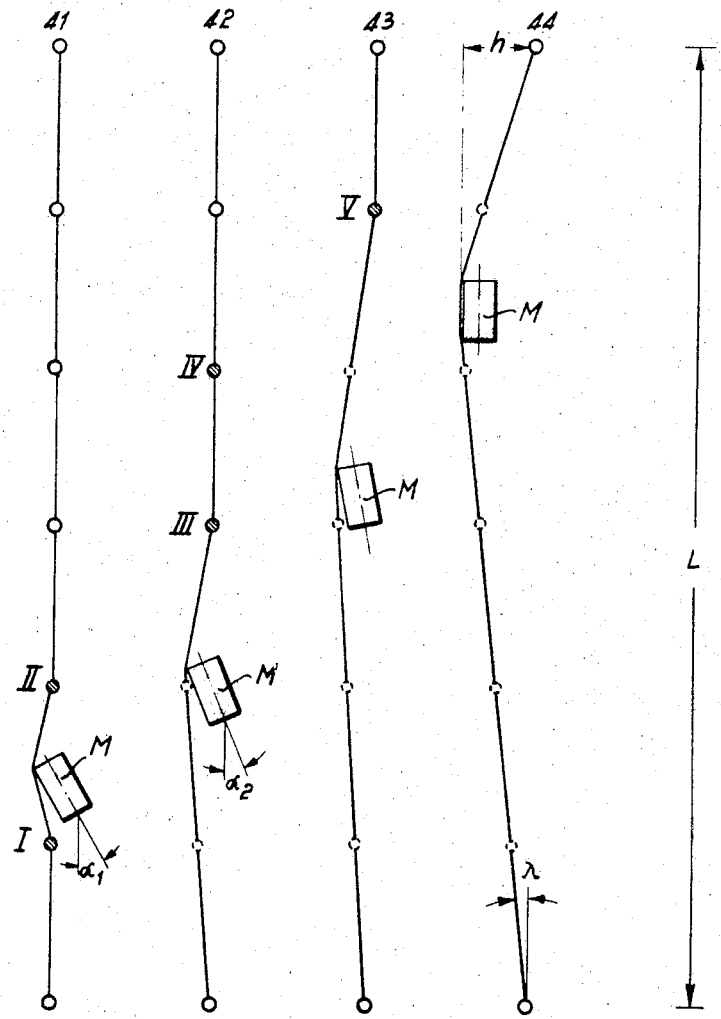
FIG. 4 is a schematic view showing the safety fence in four consecutive phases from the moment it is run against by a motor vehicle to the moment the motor vehicle has been reoriented and brought to a standstill by the safety fence.

FIG. 4 schematically illustrates in four different phases 41, 42, 43 and 44 the mode of operation of the safety fence. In the first phase 41, a motor vehicle M is shown to run at an acute angle $\alpha 1$ against the safety fence between two post members I and II thereof. The cables yield and attenuate the impact. The impact causes the shearing pins of the posts I and II to shear off, whereby part of the transverse force of the motor vehicle M is destroyed. At the same time, the cables further yield as they get slackened over a long distance upon the breakage of the shearing pins and thus of the posts I and II. While sliding along the slackened cables, the motor vehicle M is slightly reoriented, as can be seen from the decreased angle $\alpha 2$ in phase 42.

In phase 42, the motor vehicle M successively breaks the shearing pins of two further post members III and IV, whereby again part of the transverse force is destroyed while the slackened length of the cables and thus their yieldingness is increased. By sliding further along the slackened cables, the motor vehicle M again is slightly reoriented. In phase 43, finally, the shearing pin of another post member, designated by V, is ruptured, whereby the remaining transverse force is destroyed. The longitudinal axis of the motor vehicle M now extends nearly parallel to the safety fence, that is to say, it has substantially been reoriented to its original direction of travel. Simultaneously, the motor vehicle M has been brought to a standstill owing to the friction produced by sliding along the cables of the safety fence.

This sequence will be obtained only if the predetermined breaking zone formed by the reduced portion 30 (FIG. 3) of the upper portion of the shearing pin is properly dimensioned. In this conjunction, the shearing pin material is of importance in addition to the shearing cross section or the section modulus. What matters in the first place is the resistance to rupture and the breaking elongation of the shearing pin material. Based on this knowledge, the invention proposes cast iron as a shearing pin material because with cast iron these factors can be determined with sufficient accuracy and will not change, either, in the course of time, for example by atmospheric influences. It is self-evident that the number of post members of which the shearing pins are sheared off may be larger or smaller than shown in FIG. 4, which depends on the speed and weight of the motor vehicle M and on the angle with which it runs against the safety fence.

As is further illustrated in FIG. 4, the motor vehicle M while sliding along the progressively slackening cables is gradually reoriented to its original direction of travel.

By the frictional engagement with the cables, mainly the longitudinal force of the motor vehicle M is destroyed. The braking efficiency of the safety fence is increased by the wire nettings 23 (FIG. 1) attached to the cables of the safety fence. When the motor vehicle M brushes along over the safety fence, these wire nettings are pushed together and thus produce a cushioning effect.

The material of the shearing pins 22 must be such as to ensure that over a given length L of the safety fence all shearing pins will be sheared off one after the other. Consequently, the material must have a certain brittleness. Experiments carried out with gray cast iron GG 26 (corresponding to AISI Class 40 Medium Section) have been successful. This gray cast iron contains lamellary graphite and has a minimum tensile strength of 16.506 t./sq. in.

On the other hand, attention is to be paid to the fact that the impact may cause successive explosion-like breakage of the immediately concerned post members, or rather, of the shearing pins thereof, which again will cause the cables to vibrate. It has to be avoided that such vibration of the cables results in the rupture also of such shearing pins as pertain to post members not directly engaged in the interception of the motor vehicle that has collided with the safety fence. This requirement puts a limit to the brittleness of the shearing pins. In view of this, also pearlite iron with a nickel addition and an increased elongation at fracture of 3% has been successfully used as a shearing pin material.

The data stated impart to one skilled in the art a teaching sufficiently exact to permit the realization of a safety fence as proposed by the present invention. In each specific case, the values will be chosen so as to be within or to pass, the indicated limits. It will likewise be necessary to dimension the shearing pins in agreement with the post spacing. A post spacing of 2.50 meters has had satisfactory results.

In phase 44 of FIG. 4, $h$ designates a further value to be taken into consideration. Precisely, the value $h$ gives the measure by which the safety fence has yielded to the impact of the motor vehicle M during the collision and must not exceed, for example, three meters lest the intercepted motor vehicle M all the same endanger, or collide with, the opposing traffic. The slackened cables are deflected from normal by the angle $\lambda$.

FIGS. 5 and 6 show a post member 20' to which a number of pair of vertical straps 2 are fixedly attached. This post member 20' has a rectangular horizontal cross section. A cable supporting hook 32 is stamped out of each strap and angularly bent upwardly so that its free end extends parallel to the post member 20'. In these cable supporting hooks 32 cables 45 tensioned in the longitudinal direction of the safety fence are loosely inserted from above.

As can be seen from FIGS. 5 to 8, in this embodiment of the invention shearing pins 50 of substantially rectangular cross section are used. In order to facilitate assembly of the shearing pin 50, the socket member 8 and the post member 20', the upper end portion 25' and the lower end portion 26' may, however, be modified so as to be symmetrically kidney-shaped as shown in FIGS. 10 and 9. In the case of such cross sections 25'a and 26'a merely the round projections have to be shaped.

FIG. 5 shows a safety cable 9 one end of which is passed horizontally through the post 20' and the upper end portion of the shearing pin 50 and is secured against withdrawal by a clamping member 10. The other end of the safety cable 9 is in the form of a loop 11 which is likewise secured by a clamping member 12. Thus the safety cable 9 prevents the entire post member 20' from being uncontrollably flung away when a motor vehicle runs against it.

The above-described features of the present invention considerably influence the efficiency of the safety fence and are of decisive importance for the entire functioning.

The supporting hooks, in which the cables tensioned in the longitudinal direction of the safety fence are loosely inserted, serve to keep the cables at the desired height. When a motor vehicle runs against the safety fence, the sheared post is intended to disengage from the cables; owing to the cable supporting hooks, which are open at their upper ends, the disengagement of the posts from the cables is possible. Since the cables produce vibrations when the motor vehicle collides with them, it is expedient, as shown in FIGS. 12 and 13, to provide downwardly directed noses 13 above the top cable 45 so that this cable is not likely to slip out of the cable supporting hook 14. There is so great a space between the nose 13 and the supporting hook 14 that in the case of falling of the post member 20', the cable 45 can disengage therefrom.

The shearing pins according to FIGS. 5 to 10 are made of untempered cast iron and serve the following purpose. When a vehicle runs against the safety fence at an acute angle, the post members are intended to shear off one after the other in the direction of the cables and travel and for that reason they are constructed to react upon any impact in this direction. However, the post members remaining in their vertical positions serve to attenuate the strong transverse forces which are caused by the yielding of the cables and for that reason these post members are of the greatest possible resistance against any forces acting in the direction transverse of the cables. It will be noted from FIGS. 5, 7 and 8 that the shear pins have an effective cross-sectional dimension which is greater in a direction transversely of said line of posts than in a direction parallel to the line of said posts, there being a high strength of shear in the direction transversely of said cables and a low strength of shear in the longitudinal direction of said cables.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a safety fence for delineating at least one boundary of a road and for preventing a colliding automobile from escaping that boundary, wherein said fence has a plurality of post members spaced in line along said road; each of said post members comprising an elongated upper post portion, a socket member firmly embedded in the ground, and a shear pin having its lower end embedded in said socket member and its upper end embedded in the lower end of said post portion, said shear pin being of material weaker in shear than the material of said upper post portion and said socket member; said post members having elongated cable means secured thereto, said cable means being anchored at opposite ends; and said cable means constraining the impact force of a vehicle which collides with sufficient force to cause said shear pins to fail, and reorienting the direction of travel of said vehicle through the increase of slack caused by successive breaking of said shear pins; the improvement wherein:

said shear pins have an effective cross-sectional dimension which is greater in a direction transversely of said line of posts than in the direction of said line parallel to posts, whereby the pins will shear in the direction of said cable means but will strongly resist shear forces in a transverse direction.

2. A structure as set forth in claim 1, wherein:

said cable means are releasably fastened to said posts by a plurality of pressure-releasable cable holding means, whereby said cable means will be released from said posts as the pins are successively sheared.

3. A structure as set forth in claim 2, wherein:

at least one of said cables of said cable means is connected to each post by an elongated, flexible connector of a length adapted to permit said cable to separate from said cable holding mean when shearing occurs.

4. A structure as set forth in claim 1, wherein:

said cable means are releasably fastened to said posts by a plurality of upwardly opening cable holding slots; and at least said top slot of each of said posts has a hooked-nose element on said post opposed to and spaced from the top of said slot by a distance at least as great as the cross-sectional dimension of said cable means.

5. A structure as set forth in claim 1, wherein:

the dimension of said shear pin in cross-section, transversely of said line of posts, is greater than the dimension of said shear pin in cross-section in the direction of said line of posts.

6. A structure as set forth in claim 1, wherein:

the shear pins are kidney-shaped in horizontal cross-section.

References Cited

UNITED STATES PATENTS

| | | | |
|---|---|---|---|
| 286,182 | 10/1883 | Cunningham et al. | 256—52 |
| 423,633 | 3/1890 | Saxon et al. | 287—189.36 |
| 433,001 | 7/1890 | Hall | 287—189.36 X |
| 1,237,997 | 8/1917 | Boone | 356—53 X |
| 1,335,617 | 3/1920 | Solomon | 52—296 |
| 1,714,388 | 5/1929 | McBride | 256—52 |
| 1,811,892 | 6/1931 | Osborne et al. | 256—50 |
| 1,913,715 | 6/1933 | MacDonald | 256—13.1 |
| 2,005,418 | 6/1935 | Gleason et al. | 256—13.1 |
| 2,085,074 | 6/1937 | Boyles | 287—107 |
| 2,337,626 | 12/1943 | Sawyer | 256—13.1 |
| 3,127,870 | 4/1964 | Bieber | 256—65 X |
| 3,210,051 | 10/1965 | Case | 256—31.1 |

FOREIGN PATENTS

| | | |
|---|---|---|
| 324,293 | 1/1930 | Great Britain. |
| 1,005,931 | 9/1965 | Great Britain. |

DAVID J. WILLIAMOWSKY, *Primary Examiner.*

DENNIS L. TAYLOR, *Examiner.*